Oct. 2, 1962 — H. P. GRAY — 3,056,458
TRACTOR HITCH ORGANIZATION
Filed June 3, 1959 — 3 Sheets-Sheet 1

INVENTOR.
HAROLD P. GRAY
BY
Wheeler, Wheeler + Wheeler
ATTORNEYS

Oct. 2, 1962 H. P. GRAY 3,056,458
TRACTOR HITCH ORGANIZATION
Filed June 3, 1959 3 Sheets-Sheet 2
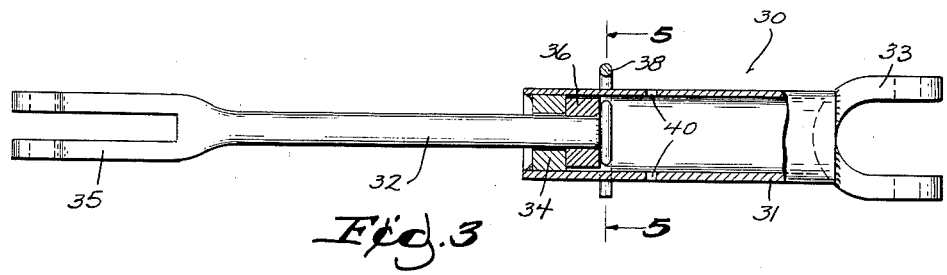
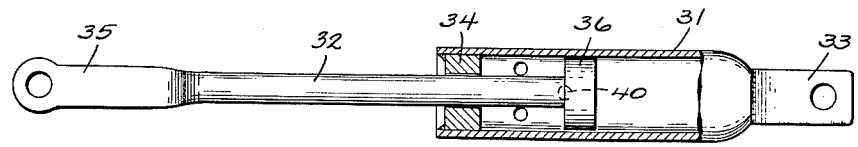
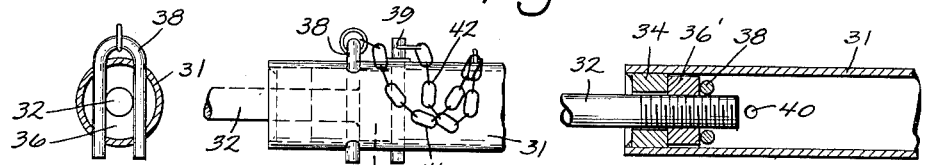
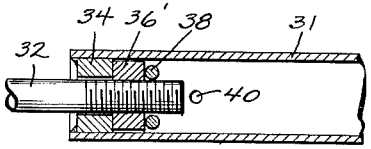
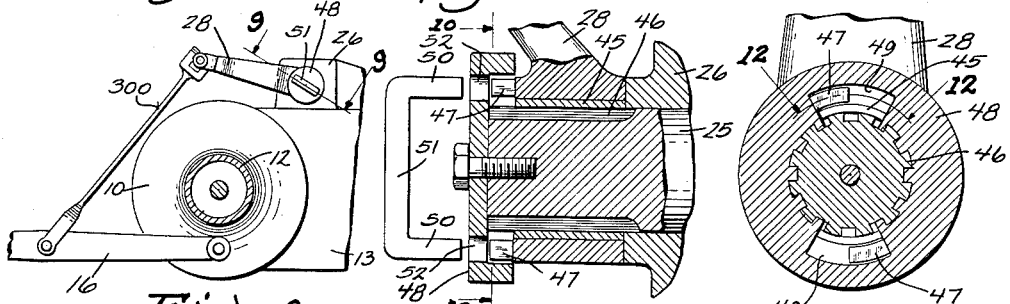
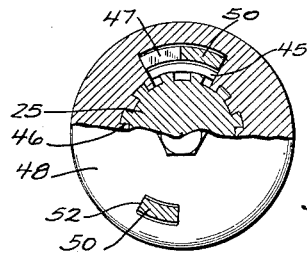
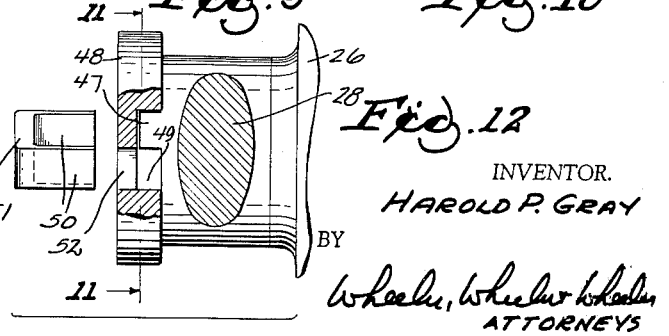
INVENTOR.
HAROLD P. GRAY
BY
Wheeler, Wheeler & Wheeler
ATTORNEYS Oct. 2, 1962 — H. P. GRAY — 3,056,458
TRACTOR HITCH ORGANIZATION
Filed June 3, 1959 — 3 Sheets-Sheet 3
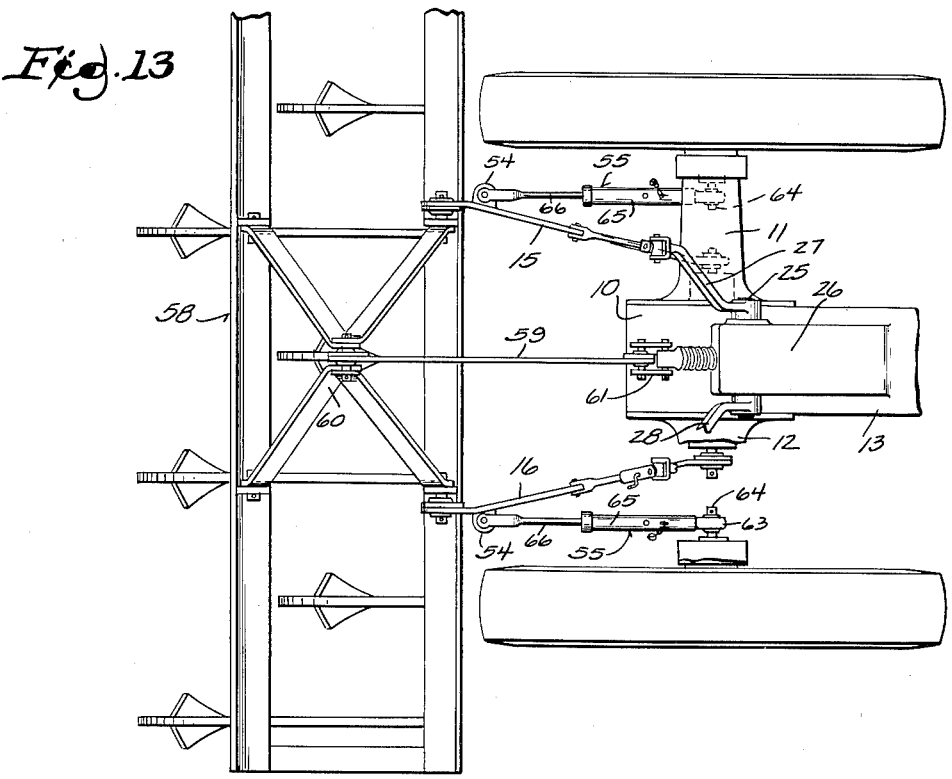
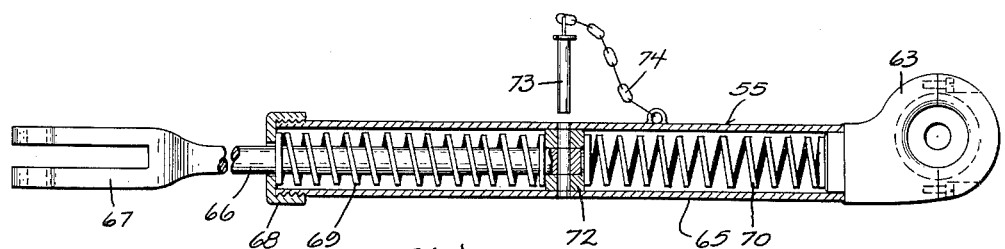
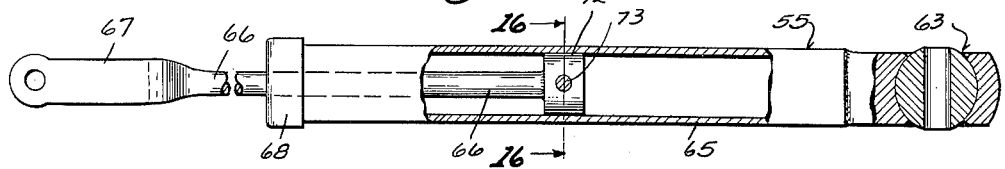
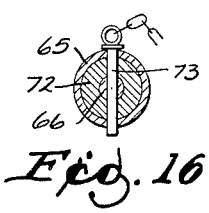
INVENTOR.
HAROLD P. GRAY
BY
Wheeler, Wheeler & Wheeler
ATTORNEYS United States Patent Office 3,056,458
Patented Oct. 2, 1962

3,056,458
TRACTOR HITCH ORGANIZATION
Harold P. Gray, 522 3rd St., Traverse City, Mich.
Filed June 3, 1959, Ser. No. 817,868
6 Claims. (Cl. 172—448)

This invention relates to a tractor hitch organization providing sway bars and hoist linkages usable to meet all requirements and adapted for adjustment by the operator without leaving his seat on the tractor under most conditions where adjustment is required.

Tractors are conventionally provided with towing links which may be connected directly to some implements or which may mount a drawbar for other towing purposes. The towing links may be raised and lowered about their pivotal connection with the tractor by means of a hydraulically operated rockshaft which has lift links connecting its arms with the towing links. For certain purposes, these lift links have to have fixed length in order to accomplish their function. In other towing jobs, it is undesirable to have a fixed length connection between the lift arms and the towing links. The present invention contemplates lift links of variable length with means for fixing the length of the respective links at certain predetermined values or for allowing the lift link sections to telescope freely with respect to each other, thereby avoiding any fixed connection. Removable pins are preferably used for making these adjustments and the pins may be inserted or removed by the operator without his leaving his seat on the tractor.

The conventional tractor also includes sway bars which are pivoted to the rear axle of the tractor, desirably coaxially with the respective tow linkage pivots. For certain purposes, these sway bars are needed and for other purposes, any rigid connection between the axle and outer end of the tow link is undesirable. According to the present invention, the sway bar, like the lift link, is made of telescopically yieldable sections. However, in the case of the sway bar, I prefer to use centering springs which permit the respective sections to move telescopically in either direction from a normal intermediate length. Means is also provided for locking the relatively movable sections against telescopic movement under conditions when a rigid sway bar is called for.

The telescopically adjustable lift link and the telescopic sway bar are independently usable when so required, but normally they will both be left permanently in place on the tractor for separate or conjoint use to achieve the desired control.

In the drawings:

FIG. 3 is an enlarged detail view of the lift linkage in one extreme position of adjustment, portions being shown in axial section.

FIG. 4 is a view similar to FIG. 3 showing the lift linkage with its component parts free for relative telescopic movement.

FIG. 5 is a detail view in section taken on line 5—5 of FIG. 3.

FIG. 6 is a fragmentary detail view of the lift linkage in side elevation as it appears when the parts are locked in an intermediate position of fixed adjustment.

FIG. 7 is a fragmentary detail view similar to a portion of FIG. 3 showing a slightly modified embodiment which provides screw threads between one of the sections of the lift linkage and the adjustable head for further refinement of length adjustment.

FIG. 8 is a view on a reduced scale somewhat similar to FIG. 2 showing in side elevation a modified arrangement for locking the linkage to the lift mechanism or freeing it therefrom.

FIG. 9 is a view on a larger scale taken on line 9—9 of FIG. 8.

FIG. 10 is a view taken on line 10—10 of FIG. 9.

FIG. 11 is a fragmentary detail view taken in the plane indicated at 11—11 of FIG. 12, but showing the locking key in place.

FIG. 12 is a view taken on the line 12—12 of FIG. 10.

FIG. 13 is a plan view of my improved hitch mechanism, the rear end of a conventional tractor being fragmentarily illustrated and the hitch mechanism being shown applied to the towing of a cultivator fragmentarily illustrated.

FIG. 14 is an enlarged fragmentary detail view of the sway bar as it appears in axial section.

FIG. 15 is a view taken in a plane at right angles to that of FIG. 14 showing a somewhat modified sway bar construction partly illustrated in side elevation and partly in section.

FIG. 16 is a detail view taken on the line 16—16 of FIG. 15.

Several of the views show the rear end portion of a conventional tractor which has a differential housing 10, axles 11, 12, a body 13 and seat 14.

Figure 1:
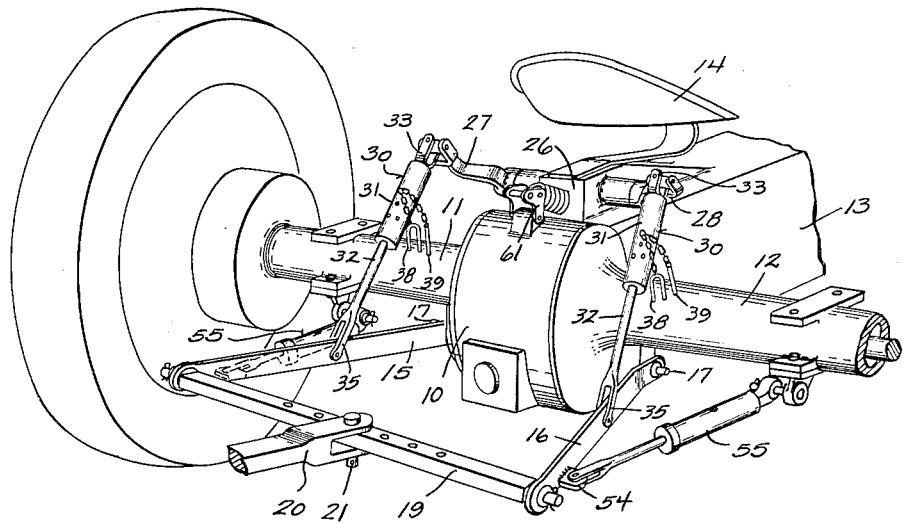
FIG. 1 is a fragmentary view in rear three-quarter perspective of a conventional tractor to which my improved lift linkage and sway bar linkage has been applied.

Such a tractor is connected to a towed vehicle or implement by means of tow links 15, 16, these being pivoted at opposite sides of the differential housing by means of laterally projecting pintles 17. These links may be connected directly with a towed implement such as the plow 18 or they may be attached pivotally to a drawbar such as that shown at 19 in FIG. 1 to which the tongue 20 of a trailer or manure spreader or other vehicle may be connected by means of pin 21.

When the towed object is another vehicle, it is not ordinarily necessary to raise and lower the tow links 15, 16 by power, except for the purpose of facilitating the making of a coupling. However, when the object which is being towed is an implement such as a plow, it is frequently necessary to raise or lower the links 15, 16 either for the purpose of lifting the implement from the ground or for determining the depth at which it will operate. The conventional tractor has a rockshaft at 25 which projects from the differential housing extension 26 and has lift arms 27, 28 which are usually connected by lift links of fixed length with the tow links 15, 16. The means for oscillating the rockshaft by power varies but ordinarily includes a hydraulic ram (not shown) within the tractor. In any event, the means for power operation of the rockshaft 25 constitutes no part of the present invention.

The present invention proposes to substitute telescopic lift arms for the arms of fixed length which are commonly used. Each of the lift arms 30 comprises first and second sections 31 and 32 which are normally freely movable with respect to each other as shown in FIG. 4. There are many ways in which relative longitudinal movement between the sections may be accommodated. The construction I prefer involves making the section 31 cylindrical, with a clevis at 33 for its connection with the lift arm 27 or 28. The end of the cylinder has a bearing closure at 34 within which the rod-like section 32 of the lift link is reciprocable. This section also has a clevis at 35 to receive the towing link 15 or 16, as the case may be. To keep the rod from cramping in the bearing provided by the closure 34, a head 36 is provided on the front end of the rod. This head slides in the cylindrical section 31 as a piston slides within a cylinder, but presently I am not interested in compressing or displacing any fluid, the head 36 being used for bearing purposes only. The head 36 may either be welded on the rod section 32 of the link as shown in FIG. 3 and FIG. 4 or it may be screw-threaded thereon as shown at 36' in FIG. 7.

If it be desired to establish a lift link of fixed length between the tow link and the lift arm, the head 36 is locked in a selected position within the cylindrical lift link section 31. FIGS. 3 and 5 show how the head 36 may be locked against the bearing closure 34 by inserting a staple-like detent 38 through openings provided in the cylindrical section 31. If it is desired to shorten the overall length of the link, while retaining the link fixed, the staple may be dropped behind the head 36 as shown in FIG. 6 and a separate pin 39 may be passed through the cylinder openings 40 in front of the head, thereby securely fixing the head in this intermediate position. The staple 38 and pin 39 may be provided with chains such as those shown at 41 and 42 respectively, whereby they will be retained conveniently accessible to the operator when not in use. The operator can readily reach the staple and pin from his seat 14 on the tractor so that he does not even need to dismount in order to release the two sections and leave them free for relative movement as shown in FIG. 4.

For greater refinement of adjustment, the rod section 32 is threaded within the head 36' as shown in FIG. 7. By having this rotative adjustment made in advance, the link will always be fixed in the desired adjustment when anchored by the staple 38.

When the staple is removed, the tow links 15 and 16 will move freely up and down, thus giving the same mode of operation as if the lift links were wholly removed from the tractor. Yet the lift links can be made available immediately either by dropping the staple or pin in place to intercept movement of the head 36 or, alternatively, by operating the rockshaft through a range which is greater than can be accommodated by the relative movement of the head 36' within the link section 31. It is advantageous to leave the lift link sections free for relative movement during normal operation, at the same time providing that such relative movement be limited so that it is possible to lift the implement from the ground by exceeding the range of relative lift link section movement when desired.

As an alternative arrangement, a lift link 300 of fixed length may be used as shown in FIGS. 8 to 12, the relative movement being accommodated between the rockshaft 25 and its respective arm 27 or 28. To permit limited relative movement at this point, the rocker arm is mounted on a bushing 45 which enables it to rotate freely on the splines 46 of the rockshaft. The arm has one or more projecting lugs at 47. The cap 48 is splined to the rockshaft and has recesses 49 into which the lugs 47 project. The angular extent of these recesses is considerably greater than the arcuate extent of the lugs, thereby accommodating considerable lost motion between the rockshaft and the arm. This lost motion permits the tow links 15, 16 and their rigid lift links 300 to move freely as the towed implement or a vehicle passes over ground inequalities. However, when it is desired to lift the towed implement from the ground, it is only necessary to oscillate the rockshaft beyond the range of lost motion permitted by the lugs 47 and recesses 49, whereupon the rocker arms will be picked up in the continued rotation of the rockshaft to lift the fixed length links 300 and towing links 15, 16, and the implement connected thereto.

When it is desired to eliminate this lost motion, it is only necessary to plug the excess length of the recesses 49 by inserting fillers 50 therein. In practice, the filler blocks may comprise the ends of a staple-like tool 51 (FIG. 9). The cap 48 has openings at 52 to permit the blocks 50 to be inserted through the cap into the portions of the recesses 49 which are not occupied by the lugs 47. With the blocks in place, no relative movement is possible between the rockshaft 25 and the arms provided with lugs 47, this arrangement being shown in FIG. 11.

Figure 2:
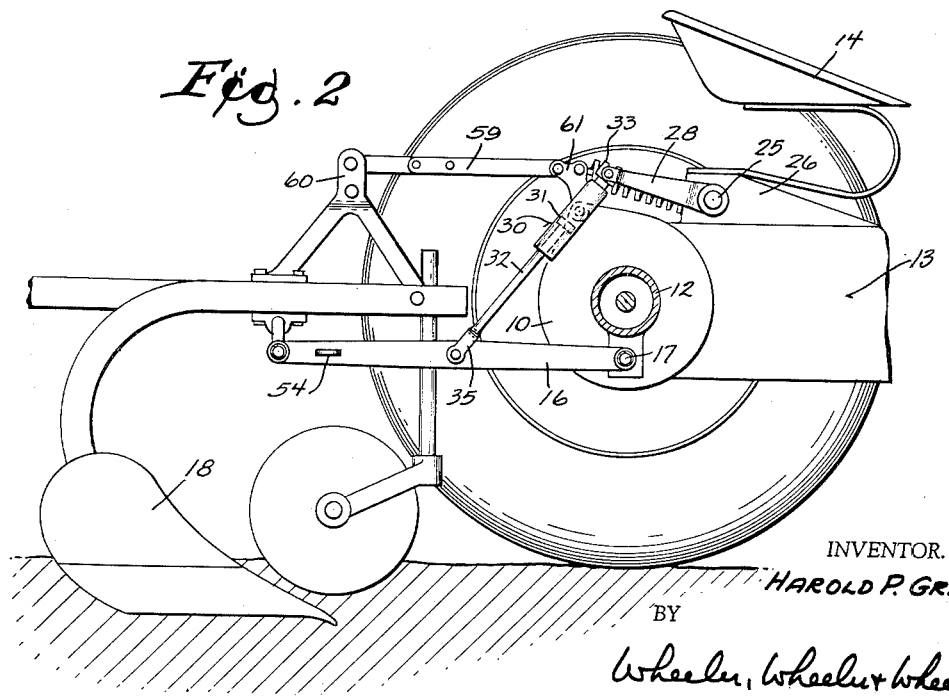
FIG. 2 is a view of the lift linkage in side elevation, the tractor axle being cut in transverse section.

The towing links 15, 16 have laterally projecting ears 54 for the application of sway bars 55 which conventionally provide a rigid connection between the rear ends of the towing links and the axle housings 11, 12 of the tractor. These sway bars are very important when the tractor is in use for towing a trailer or the like. However, in the case of an implement having a three point hitch as the plow 18 of FIG. 2 or the harrow 58 of FIG. 13, the tractor cannot be steered if the rigid sway bars are left connected as shown. The "three point hitch" refers to the additional linkage shown at 59 for connecting the post 60 on the implement either directly with the tractor or with the bell crank 61 which, in particular cases, is used for automatic control of the position of the power driven rockshaft 25.

In order to keep the sway bars available when needed, while at the same time preventing them from interfering with normal control of a tractor towing an implement with a three point hitch, I provide a telescopically adjustable sway bar 55 having at its forward end the usual universally swiveled bearing 63 which receives the pin 64 fixed to the tractor. The forward section of the sway bar is desirably cylindrical as shown at 65, while the rear section desirably comprises a rod 66 having a clevis 67 for connection with the implement. The cylindrical section 65 is closed by a cap 68 through which the rod is freely reciprocable and which also provides a seat for the compression spring 69. Another compression spring 70 seats at the forward end of the cylinder. Between the springs is interposed a piston-like head 72 at the forward end of the rod section 66 of the sway bar. A removable crosspin 73 anchored to the forward section of the sway bar by means of a chain 74 can be inserted through registering apertures in the cylinder 65 and the head 72 to lock the sway bar at a fixed length, thus adapting it for performance of its usual function when towing a trailer or other vehicle. With the pin 73 removed, the sway bar can vary in length. The springs 69 and 70 are optional and may also be omitted as shown in FIG. 15. In either case, the length of the sway bar will adapt itself to relative movements between a vehicle and tractor, even though the vehicle has a three point connection. Thus it becomes unnecessary to remove and store the sway bar when towing such as implement. I consider it advantageous to have the head 72 self-centering between the compression springs 69 and 70, thereby facilitating the application of the pin 73 when desired. However, many of the advantages are obtainable without these springs and, hence, I have included in FIG. 15 a disclosure of the arrangement in which the springs have been omitted.

With the springs, the sway bars function to tend to maintain alignment between the implement and the tractor, but without that rigidity which, but for the relative movement between the sway bar sections, might lift one side of the implement from the ground.

As disclosed, the invention accommodates all conditions of operation, making it possible to adjust the length of either sway bar or either lift link independently of the other. This is a great advantage when the tractor is operating with one wheel in a previously made furrow whereby the tractor is tilted and the implement or vehicle desirably remains level.

A major advantage of the apparatus is that no parts need to be removed and stored. Everything is immediately available and in permanent connection with the tractor and the rest of the hitch. It will also be observed that these devices are not merely lost motion devices, nor pressure balancing devices. In addition to their several functions in these respects, these devices are capable of being locked in one or more positions of minimum as well as maximum extension and can be released by the operator from the driver's seat. Moreover, while they are usable independently, they are also valuable when used together.

I claim:
1. In a tractor hitch for application to a tractor having a power driven rockshaft and draft links and a rear axle, the combination with the draft links, of means including lift links for transmitting motion from the rockshaft to the draft links, said last mentioned means including parts relatively movable with lost motion and means for locking said parts against said lost motion movement, the relatively movable parts comprising a first part in fixed connection with said rockshaft and a second part in nonyielding motion transmitting connection with a draft link and oscillatable coaxially with the first part, one of said first and second parts having a lug projecting toward the other one of said first and second parts and said other one of said first and second parts having spaced surfaces between which said lug has relative movement to the extent defined by the space between the surfaces, such space exceeding the width of the lug.

2. The device of claim 1 in which the means for locking said parts against lost motion movement comprises a block receivable between said lug and one of said surfaces.

3. In a tractor hitch for application to a tractor having a power driven rockshaft and draft links and a rear axle, the combination with the draft links, of means including lift links for transmitting motion from the rockshaft to the draft links, said last mentioned means including parts relatively movable with lost motion and means for locking said parts against said lost motion movement, and stay means connecting each draft link with the tractor axle, the respective stay means and draft links having substantially coaxial pivotal connection with the axle, the stay means comprising telescopically reciprocable parts, one of which has spaced spring seats and the other of which has a spring seat intermediate the spaced seats aforesaid, means including centering springs engaging said seats and acting oppositely between said parts for maintaining said parts in a normally centered position, and means for releasably locking said parts in said centered position.

4. A device in accordance with claim 3 wherein said relatively movable parts comprise a first part in fixed connection with said rockshaft and a second part in nonyielding motion transmitting connection with a draft link and oscillatable coaxially with the first part, one of said first and second parts having a lug projecting toward the other of said first and second parts and said other of said first and second parts having spaced surfaces between which said lug has relative movement to the extent defined by the space between said spaced surfaces, such space exceeding the width of said lug, and wherein said means for locking said parts against lost motion movement comprises a block receivable between said lug and one of said surfaces.

5. In a tractor hitch for use with a tractor having a rear axle and draft links connected therewith, of stay means connected with the axle outwardly of the respective draft links and extending respectively rearwardly from the axle and having their rear ends connected with respective draft links, the respective stay means comprising telescopically reciprocable members and means for releasably locking said members against relative reciprocation, the relatively reciprocable members respectively comprising a cylinder and a headed rod, the head of said rod being movable in the cylinder, the cylinder being provided with spring seats and having opposed springs engaging said head whereby normally to maintain said rod in a centered position, the means for releasably locking said members against relative reciprocation comprising a pin for which the respective members are provided with apertures registering in the position to which the spring means relatively urges said members.

6. In a tractor hitch for use with a tractor having a rear axle and draft links connected therewith, of stay means connected with the axle outwardly of the respective draft links and extending respectively rearwardly from the axle and having their rear ends connected with respective draft links, the respective stay means comprising telescopically reciprocal members and means for releasably locking said members against relative reciprocation, the relatively reciprocable members respectively comprising a cylinder and a headed rod, the head of said rod being movable in the cylinder, the cylinder being provided with spring seats and having opposed springs engaging said head whereby normally to maintain said rod in a center position, the means for releasably locking said members against relative reciprocation comprising a bifurcated pin and the cylinder having a plurality of holes spaced apart sufficiently to receive between them the head of said rod.

References Cited in the file of this patent

UNITED STATES PATENTS

| | | |
|---|---|---|
| 1,819,544 | Dech | Aug. 18, 1931 |
| 2,388,336 | Miller | Nov. 6, 1945 |
| 2,541,964 | Hennings | Feb. 13, 1951 |
| 2,611,304 | Toland | Sept. 23, 1952 |
| 2,633,067 | Cruse et al. | Mar. 31, 1953 |
| 2,704,018 | Oehler | Mar. 15, 1955 |
| 2,754,738 | Brown | July 17, 1956 |
| 2,754,742 | Altgelt | July 17, 1956 |
| 2,775,180 | DuShane | Dec. 25, 1956 |
| 2,795,178 | Silver et al. | June 11, 1957 |
| 2,796,817 | Altgelt | June 25, 1957 |
| 2,808,272 | Reese | Oct. 1, 1957 |
| 2,844,083 | DuShane | July 22, 1958 |
| 2,952,323 | Orelind | Sept. 13, 1960 |
| 2,970,659 | Bunting | Feb. 7, 1961 |
| 2,971,589 | DuShane | Feb. 14, 1961 |
| 2,971,591 | Silver | Feb. 14, 1961 |

FOREIGN PATENTS

| | | |
|---|---|---|
| 647,622 | Great Britain | Dec. 20, 1950 |